United States Patent
Ogura et al.

(10) Patent No.: US 10,817,709 B2
(45) Date of Patent: Oct. 27, 2020

(54) SIMILAR IMAGE SEARCH SYSTEM

(71) Applicant: Hitachi Kokusai Electric Inc., Tokyo (JP)

(72) Inventors: Shinya Ogura, Tokyo (JP); Yuichiro Komiya, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 16/483,024

(22) PCT Filed: Mar. 10, 2017

(86) PCT No.: PCT/JP2017/009665
§ 371 (c)(1),
(2) Date: Aug. 1, 2019

(87) PCT Pub. No.: WO2018/163398
PCT Pub. Date: Sep. 13, 2018

(65) Prior Publication Data
US 2020/0234037 A1    Jul. 23, 2020

(51) Int. Cl.
*G06K 9/00* (2006.01)
*G06F 16/58* (2019.01)
*G06F 16/55* (2019.01)

(52) U.S. Cl.
CPC ......... *G06K 9/00288* (2013.01); *G06F 16/55* (2019.01); *G06F 16/5866* (2019.01); *G06K 9/00275* (2013.01)

(58) Field of Classification Search
CPC ................. G06K 9/00288; G06K 9/00275; G06F 16/55; G06F 16/5866
See application file for complete search history.

(56) References Cited

U.S. PATENT DOCUMENTS

| | | | | |
|---|---|---|---|---|
| 9,025,836 | B2* | 5/2015 | Ptucha | G06T 11/00 |
| | | | | 382/118 |
| 9,262,614 | B2* | 2/2016 | Yamaguchi | G06F 21/32 |
| 9,449,237 | B2* | 9/2016 | Yagi | G06F 16/583 |
| 10,037,345 | B2* | 7/2018 | Chen | G06F 16/51 |

(Continued)

FOREIGN PATENT DOCUMENTS

| JP | 2000331009 A | 11/2000 |
|---|---|---|
| JP | 2009123196 A | 6/2009 |

(Continued)

OTHER PUBLICATIONS

ISA, International Search Report issued in International Application No. PCT/JP2017/009665, dated May 30, 2017.

(Continued)

*Primary Examiner* — Shefali D Goradia
(74) *Attorney, Agent, or Firm* — Greer Burns & Crain Ltd.

(57) ABSTRACT

A similar image search system is provided and searches for images similar to a search key image, where a number of searched images of person are classified into a number of groups based on a similarity between the respective images. A grouping display is performed in which at least one of the images that belongs to each group is displayed in a display region that is provided for each group. The grouping display is performed in such a manner that the order of the similarity between each group and the search key image can be visually recognized.

7 Claims, 7 Drawing Sheets

(56) References Cited

U.S. PATENT DOCUMENTS

| | | | |
|---|---|---|---|
| 10,120,879 B2* | 11/2018 | An | G06F 16/583 |
| 10,311,067 B2* | 6/2019 | Chen | G06F 16/24578 |
| 2010/0226584 A1* | 9/2010 | Weng | G06K 9/00677 |
| | | | 382/225 |
| 2013/0212089 A1 | 8/2013 | Lederer et al. | |

FOREIGN PATENT DOCUMENTS

| | | |
|---|---|---|
| JP | 2009199322 A | 9/2009 |
| JP | 2009217828 A | 9/2009 |
| JP | 2010128633 A | 6/2010 |
| JP | 2011061651 A | 3/2011 |
| JP | 2012235300 A | 11/2012 |
| JP | 2013211026 A | 10/2013 |
| JP | 2015507299 A | 3/2015 |

OTHER PUBLICATIONS

ISA, Written Opinion issued in International Application No. PCT/JP2017/009665 (English translation).

* cited by examiner

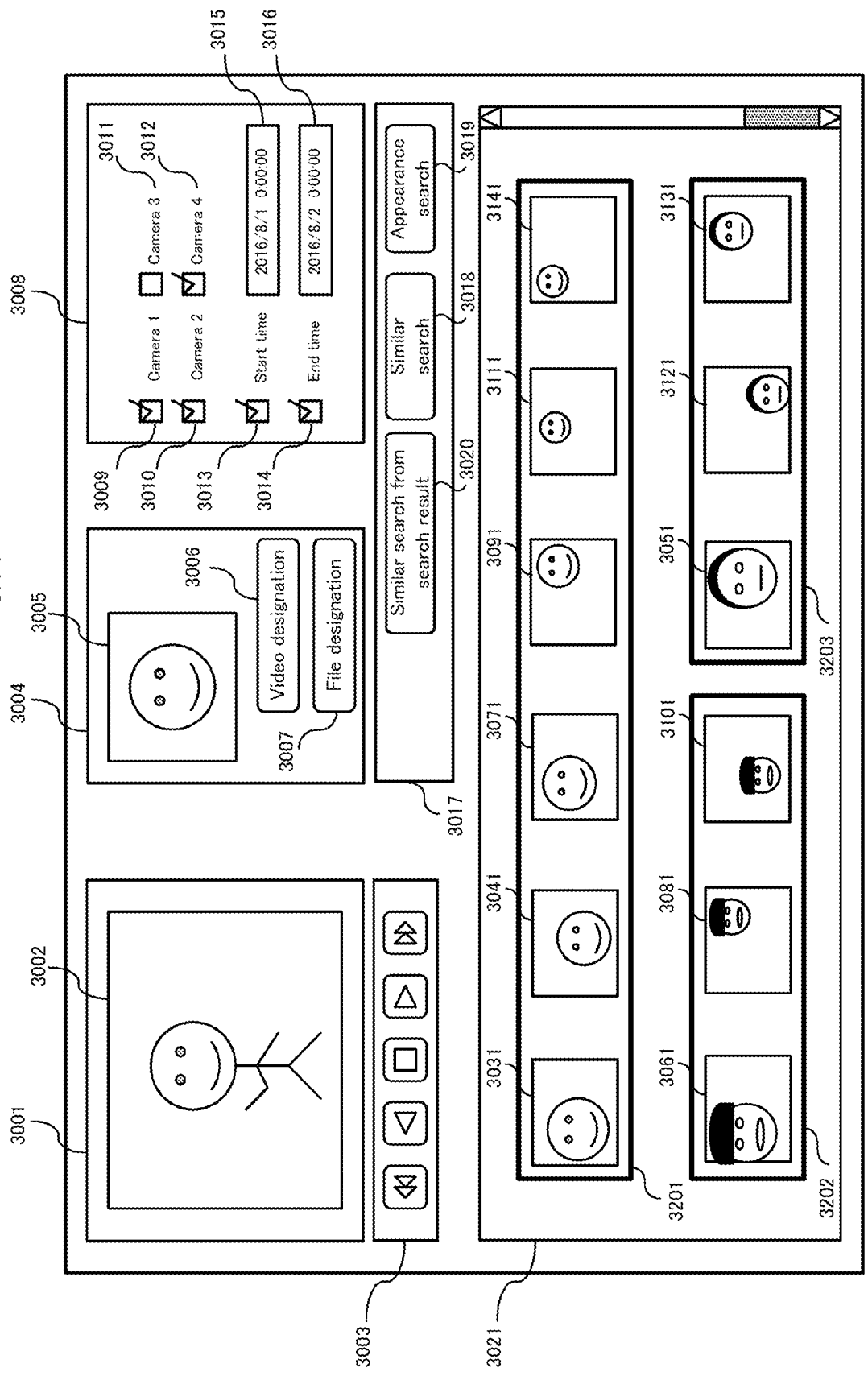

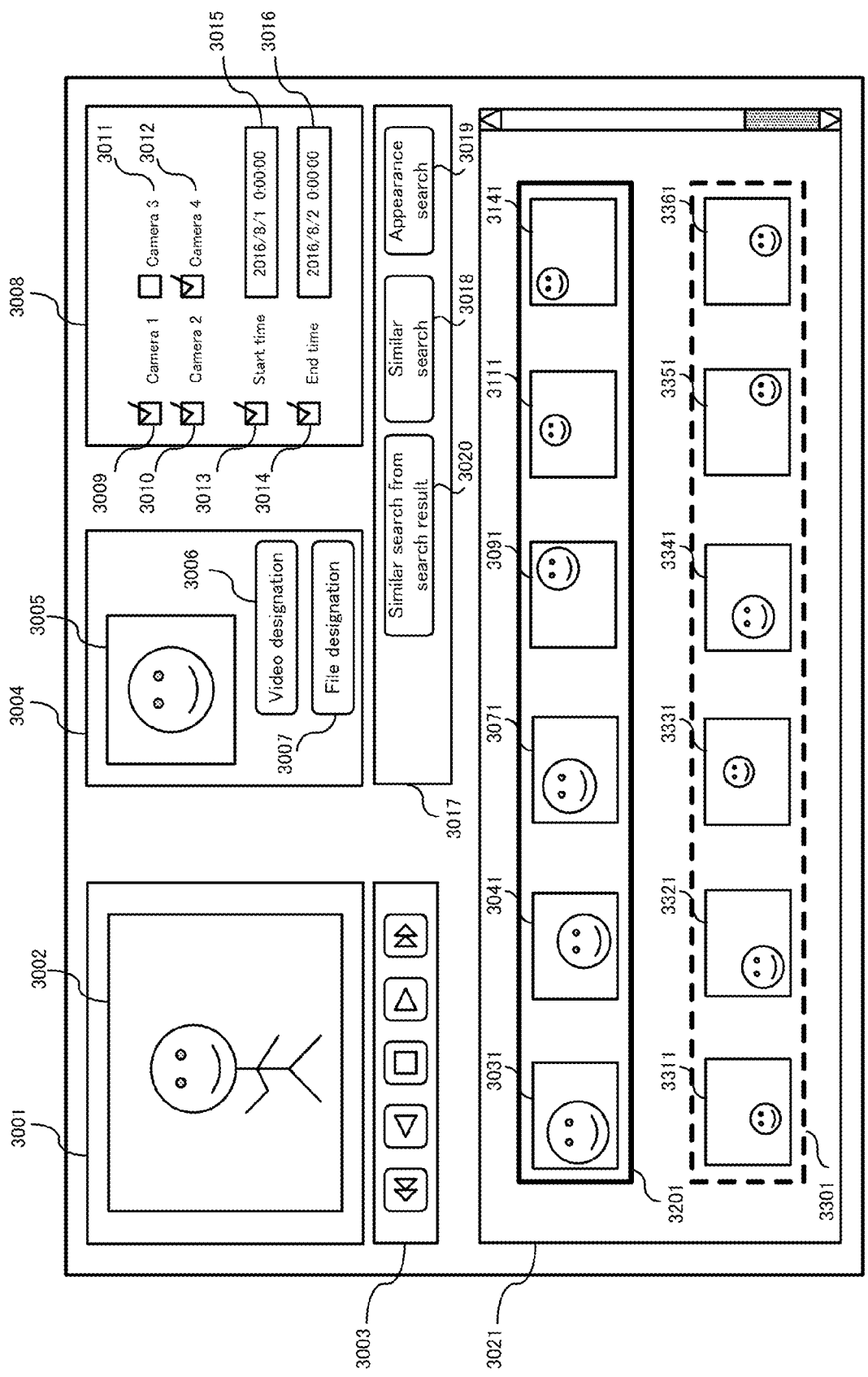

SIMILAR IMAGE SEARCH SYSTEM

CROSS-REFERENCE TO RELATED APPLICATIONS

This application is a national stage application, filed under 35 U.S.C. § 371, of International Patent Application No. PCT/JP2017/009665 filed on Mar. 10, 2017, which is incorporated by reference herein in its entirety.

TECHNICAL FIELD

The present invention relates to a similar image search system and a similar image search method, and in particular, to a similar image search system and a similar image search method that are appropriate for use in an application that makes a user interface user-friendly to search for a person in a video monitoring system.

BACKGROUND ART

A video monitoring system is installed in conventional facilities where an unspecified large number of people visit such as hotels, buildings, convenience stores, financial institutions, dams and roads for the purpose of preventing crimes and accidents. In this system, an image of a person who is the subject to be monitored is taken by an imaging device such as a camera, this video is transmitted to a monitoring center such as a management office or a security room, and a surveillant who stays there permanently monitors it in order to approach them or record/store the video if necessary or in accordance with a certain purpose.

The number of cases has increased where a random access medium represented by a hard disk drive (HDD) is used as the recording medium instead of the conventional video tape medium in order to record/store videos in the video monitoring system. Furthermore, an increase in the capacity of such a recording medium has been progressed in recent years.

The increase in the capacity of the recording medium has dramatically increased the number of videos that can be recorded in order to make possible the recording of videos from multiple points and over a long period of time. On the other hand, an increase in the burden of visually checking the recorded images has been surfacing as a problem.

Against such a background, a video monitoring system with a search function for finding a desired video more easily has been spreading. In particular, in recent years, systems with more advanced search function have been appearing where the occurrence of a particular event in the video is automatically detected in real time by using an image recognition technology in order to be recorded together with the video, and thus, the search of such an event is made possible afterwards. A typical example from among such systems relates to a person search function.

The person search function is a function to make the appearance of a person in the video the subject of an automated detection so as to be recorded in real time in such a manner that the image where the person appears can be found from the recorded images afterwards. The person search function is largely categorized into the following two types from the point of view of functions.

The first function is the appearance event search function. The appearance event search function is a function for simply finding out the existence of the appearance of a person (event) in a video. The search results presents the existence of an event, and in addition, the number of events, the time at which each event took place, the number of the imaging device that taken an image of each event, the image that has been taken (person appearance image), and the like in the case where the existence of an event was determined. In many cases, the time at which each event took place, the number of the imaging device and the like are stored for a query of this search as data to narrow the range of search subjects. In the following, the data for narrowing the range of search subjects is referred to as "narrow parameters."

The second function is a similar person search function. In contrast to the fact that the above-described appearance event search function is a function where the appearing person is not specified, this is a function for finding a certain person that has been designated by the user from among the recorded images to see if an image of the person has been taken at different times or by an imaging device at different points. The search results include the existence of other images that show the certain person, and in addition, reflect the number of such images, the time at which the image was taken, the number of the imaging device, the images that have been taken (person appearance image), the below-described similarity and the like.

The designation of a certain person is carried out by the user designates one image that shows the person to be found (hereinafter, referred to as a search key image). The search key image is designated from among the recorded images or any image taken by external devices. The search is carried out by sampling an image feature value of the person in this search key image in accordance with an image recognition technology, referring it with an image feature value of a person in the recorded images, finding the similarity (degree of similarity), and implementing the determination of whether or not the person is the same. The sampling and the recording of the personal feature value in the recorded images had been carried out in advance in accordance with a different time such as when the video was recorded. In many cases, it is possible to give narrow parameters to the search query.

In either of the two search functions, linkage data for picking out a recorded image is added to the search results so that it is possible to cue and play the recorded image from the search results.

A number of images are recorded when a person passes by the front of a camera over a period of several seconds. In the case where a person passes by over a period of three seconds the front of a security camera system where five images are taken per second, 15 images are recorded. In this case, no matter which of the two search functions is used, the user who wants to know various appearances of the person needs to carry out page forwarding of the search results many times where a great number of images that are close timewise are displayed as the search results, and thus, it is inconvenient for the user. In order to avoid this, a function is used where the search results that are close timewise are collectively displayed. This function is referred to as time contraction.

Patent Literature 1 discloses an image search device where a search key image can be designated in this manner, selected from the search results so as to be displayed in another display region, and used as the next key image, and thus, the convenience for the user is increased.

CITATION LIST

Patent Document

Patent Document 1: Japanese Unexamined Patent Publication 2009-123196

SUMMARY OF THE INVENTION

Technical Problem

In the case where a large number of cameras are installed in many places in a facility with a security camera system, only the conventional time contraction function allows the same person to appear repeatedly in the search results, which makes it difficult for the user to figure out the display. When the same person is displayed collectively in the search results, it becomes easy for the user to figure out the display. When an appropriate image selected from among the search results is used as a new key image for the search in the similar person search, in some cases the appearance of the person on a different day or in a different place that had not been found by the conventional function may be found. In this case as well, it becomes easy to search by using an appropriate image as a new key image when the images of the same person are collected.

The present invention is made in view of such a situation, and an object of the invention is to propose a technology that can prevent the display from becoming hard to figure out in the case where a large number of images of the same person as a result of the search for person images similar to the person image of the search key have been found.

Solution to Problem

In order to achieve the above-described object, the similar image search system according to the present invention is formed as follows.
(1) A similar image search system which searches for person images similar to a search key image, which is a person image of a search key, is characterized in that a number of searched person images are classified into a number of groups on the basis of a similarity between the respective person images, and a grouping display is performed in which at least one of the person images that belong to each group is displayed in a display region that is provided for each group, wherein the grouping display is performed in such a mode where the order of the similarity between each group and the search key image is capable of visually recognized.
(2) The similar image search system according to (1) is characterized in that the grouping display is performed when the number of searched person images is equal to or greater than a predetermined threshold value.
(3) The similar image search system according to (1) or (2) is characterized in that the searched person images are classified into each group on the basis of the results of at least either modification where the similarity between person images that have been taken within a predetermined period of time by different imaging devices that are in proximity to each other is increased, or the similarity between person images that have been taken within a predetermined period of time by different imaging devices that are not in proximity to each other is lowered.

Advantageous Effects of the Invention

According to the present invention, a number of person images similar to the search key image are displayed in different groups, and therefore, the display can be prevented from becoming hard to figure out in the case where a large number of images of the same person are found. In addition, the order of the similarity to the search key image for each group can be easily grasped.

BRIEF DESCRIPTION OF DRAWINGS

FIG. 7 is a diagram showing an example of the search screen in the system according to the present invention which shows how the search results are classified on the basis of the hairstyle and are developed for each person;
and
FIG. 8 is a diagram showing an example of the search screen in the system according to the present invention which shows how further search results are acquired by again searching through the search results for one person from among the search results.

DESCRIPTION OF EMBODIMENTS

In the following, one embodiment of the present invention is described in reference to the drawings. First, the configuration of the similar image search system according to one embodiment of the present invention is described in reference to FIGS. 1 through 4.

Figure 1:
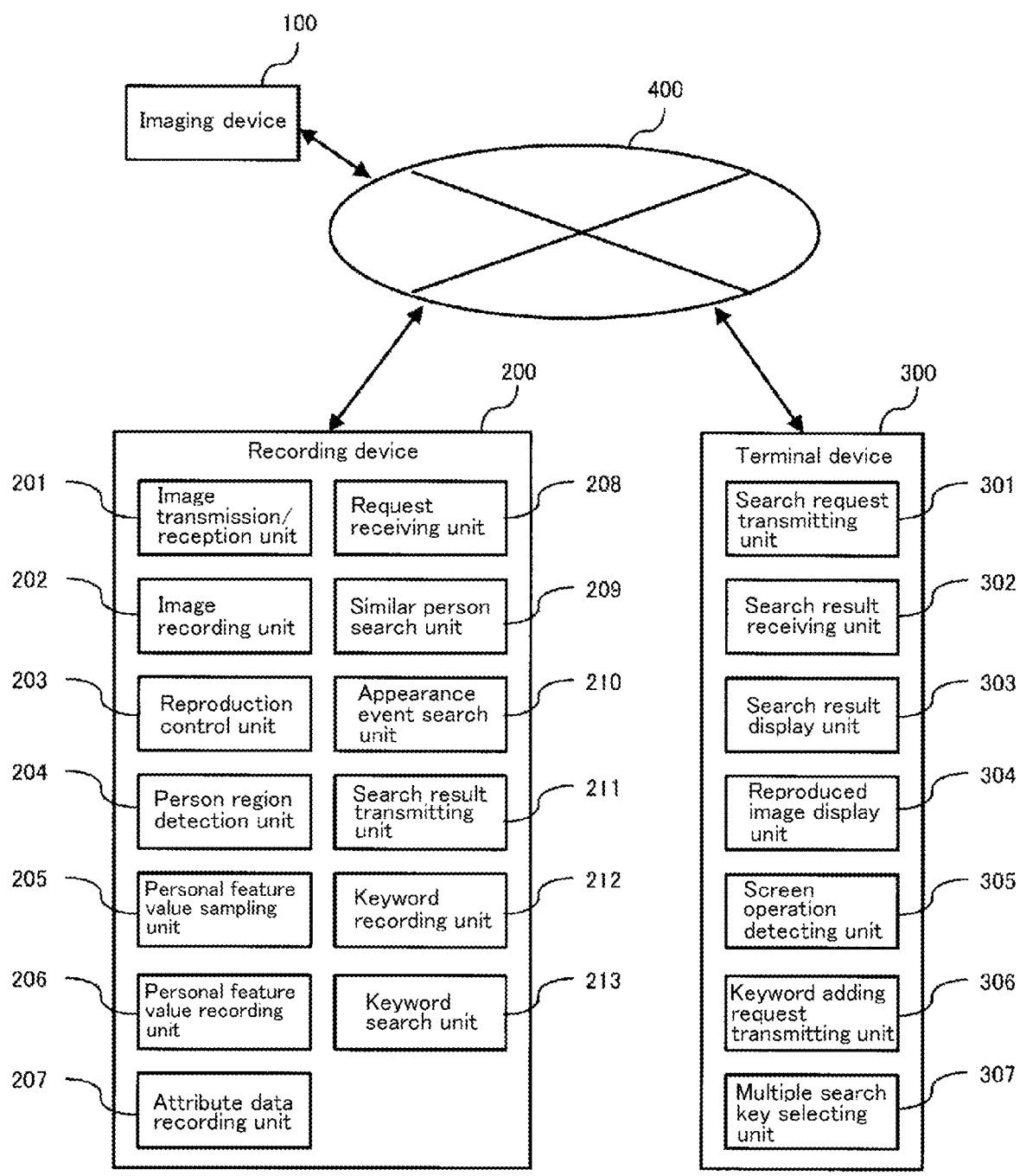
FIG. 1 is a diagram showing an example of the system configuration of the similar image search system according to one embodiment of the present invention.

FIG. 1 shows an example of the system configuration of the similar image search system according to one embodiment of the present invention.

As shown in FIG. 1, an imaging device 100, a recording device 200 and a terminal device 300 are connected to a network 400 in the similar image search system that is formed so that mutual communication is possible.

The network 400 provides a communication means for the communication between the devices that are connected to each other such as a network dedicated for data communication, an intranet system, the Internet and a wireless local area network (LAN).

The imaging device 100 is a device such as a network camera or a surveillance camera where a digital conversion process is carried out on an image that has been taken by an image sensor such as a charge coupled device (CCD) or a complementary metal oxide semiconductor (CMOS), and the converted image data is outputted to the recording device 200 via the network 400.

The recording device 200 is a device such as a network digital recorder for recording image data that has been inputted from the imaging device 100 via the network 400 in a recording medium such as an HDD. In addition, this device is equipped with a person search function including the system according to the present invention.

The recording device 200 has the respective processing units of an image transmission/reception unit 201, an image recording unit 202, an reproduction control unit 203, a person region detection unit 204, a personal feature value sampling unit 205, a personal feature value recording unit 206, an attribute data recording unit 207, a request receiving unit 208, a similar person search unit 209, an appearance event search unit 210, a search result transmitting unit 211, a keyword recording unit 212 and a keyword search unit 213 in the configuration represented by functions.

The image transmission/reception unit 201 is a processing unit for inputting and outputting an image from and to the outside of the device. The image transmission/reception unit 201 receives input image data from the imaging device 100 and transmits output image data to the terminal device 300.

The image recording unit 202 writes input image data into a recording medium and reads out output image data from the recording medium. At the time of writing in, image data is recorded, and in addition, an image ID (identification data for the image) that becomes the data used at the time of the reading out of the image data is recorded simultaneously.

The reproduction control unit 203 controls the reproduction of the video in the terminal device 300.

The person region detection unit 204 detects a person by using an image recognition technology for the input image data, determines whether the person exists in the image, and coordinates of the region is calculated in the case where the person exists.

The personal feature value sampling unit 205 calculates the feature value by using an image recognition technology for the image region that has been detected by the person region detection unit 204. For example, the image region of the subject is split (divided) into a number of blocks, edges are detected within each block, the degrees of coincidence to the basic edge pattern are summed up for each block, and weighting is carried out on a certain block, the direction of the edges and the like, and the personal feature value is calculated.

Here, the calculated personal feature value includes the shape and the directions of the contour of a face which is a representative part that specifies a person, and the sizes, shapes and arrangement relationships of the main characteristics such as the eyes, nose and mouth. In the present embodiment, any type or any number of feature value may be used. In the present embodiment, data that is consistent over a short period of time, for example, within the same day, such as the hairstyle or clothes worn but changes over a long period of time is calculated at the same time separately from the above-described permanent feature value for a person (feature value of the face). In the detection of the feature value of the face, for example, facial images that cover the entirety of a face (head excluding hair) are used. In the detection of the feature value of the hairstyle, for example, head images that cover the entirety of a head that includes the face and hair can be used in compliance with the specification of MPEG 7 (Moving Picture Experts Group 7). Here, such a problem arises that it becomes easy to be affected by the background and the hairstyle when head images are used for the detection. In order to cope with this, the feature value of a hairstyle may be detected by using images that have been categorized in the middle between facial images and head images (images that cover the face and part of the hair).

The personal feature value recording unit 206 writes and reads out the feature value that have been calculated in the personal feature value sampling unit 205 into and from the recording medium. The recording medium for the image data in the image recording unit 202 and the recording medium for the personal feature value in the present processing unit may be the same or different.

The attribute data recording unit 207 writes and reads out attribute data that relates to image data into and from the recording medium. Attribute data includes the times at which an image is taken, the number of the imaging device, data on the locations in which an image is taken and the like, for example.

The request receiving unit 208 receives a search request or a keyword adding request from the terminal device 300. The search request includes a similar image search request and an appearance event search request.

The similar person search unit 209 carried out a similar person search in the case where the request that has been received by the request receiving unit 208 is the similar person search request.

The appearance event search unit 210 carries out an appearance event search in the case where the request that has been received by the request receiving unit 208 is the appearance event search request.

The search result transmitting unit 211 transmits the similar person search results or the appearance event search results that have been acquired by the similar person search unit 209 or the appearance event search unit 210 to the terminal device 300.

The keyword recording unit 220 writes and reads out a keyword in and from the recording medium on the basis of the keyword adding request that has been received by the request receiving unit 208.

The keyword search unit 213 carries out a keyword search in the case where a keyword is included in the search request data that has been received by the request receiving unit 208.

The terminal device 300 may be implemented with a standard personal computer (PC) having a network function, or may be a dedicated search terminal.

The terminal device 300 has respective processing units as functional components, which include a search request transmitting unit 301, a search result receiving unit 302, a search result displaying unit 303, a reproduced image displaying unit 304, a screen operation detecting unit 305, a keyword adding request transmitting unit 306 and a multiple search key selecting unit 307. In addition, the present device is equipped with a person search function in order to implement the system according to the present invention.

The search request transmitting unit 301 transmits a search request to the recording device 200. In the case of a similar person search, the search request data includes a search key image. In addition, it is also possible for the search request data to include narrow parameters.

The search result receiving unit 302 receives the search results from the recording device 200. The data that is received as the search results includes a set of images that have been acquired by carrying out a similar person search or an appearance event search in the recording device 200. The individual images that form the set are generated by carrying out an image downsizing process on a video that has been recorded in the recording device 200. In the following, these individual images are referred to as "search result images," and the data to be transmitted or received as the search results is referred to as "search result data."

The search result displaying unit 303 displays on a screen the search results received by the search result receiving unit 302. Examples of the displayed screens are described below.

The reproduced image displaying unit 304 displays as a continuous animated image on a screen the image data that has been inputted from the recording device 200.

The screen operation detecting unit 305 detects and acquires the contents of the operations by the user.

The keyword adding request transmitting unit 306 transmits a keyword adding request to the recording device 200.

When a number of search key images are selected, the multiple search key selecting unit 307 carries out a process for appropriately selecting search key images of which the number is smaller. The multiple search key selecting unit 307 may be provided within the recording device 200.

Figure 2:
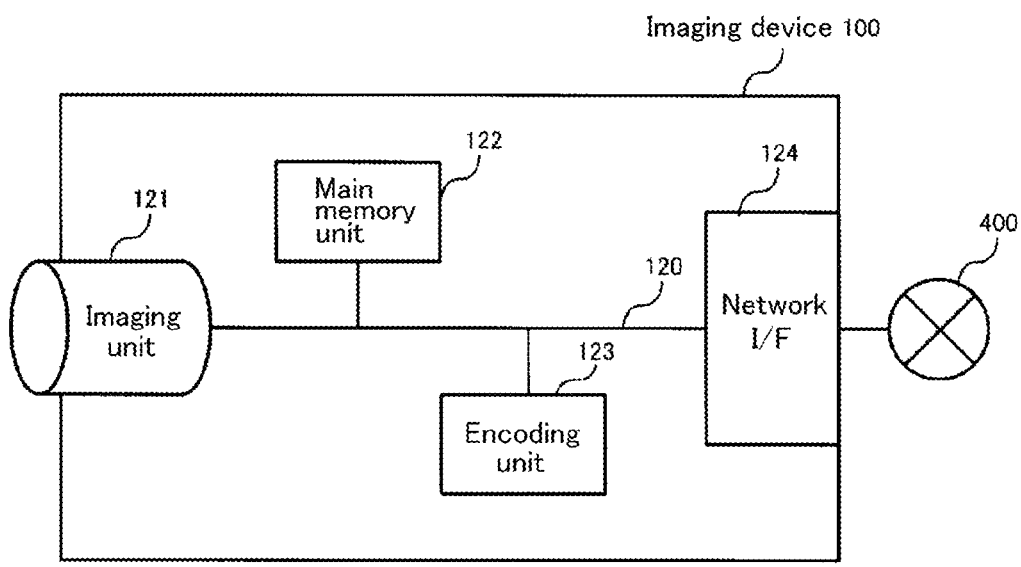
FIG. 2 is a diagram showing an example of the hardware configuration of the imaging device.

FIG. 2 shows an example of the hardware configuration of the imaging device 100.

As shown in FIG. 2, the hardware configuration of the imaging device 100 is a configuration where an imaging unit 121, a main memory unit 122, a encoding unit 123 and a network I/F 124 are connected through a bus 120.

The imaging unit 121 converts a light signal for an image taken by using a lens to digital data. The encoding unit 123 encodes the digital data that has been outputted from the imaging unit 121 so that the data is converted to image data such as a JPEG (Joint Photographic Experts Group). The main memory unit 122 stores the digital data for the images that have been taken and the encoded image data. The network I/F 124 is an interface for transmitting the image data in the main memory unit 122 to the recording device 200 via the network 400.

Figure 3:
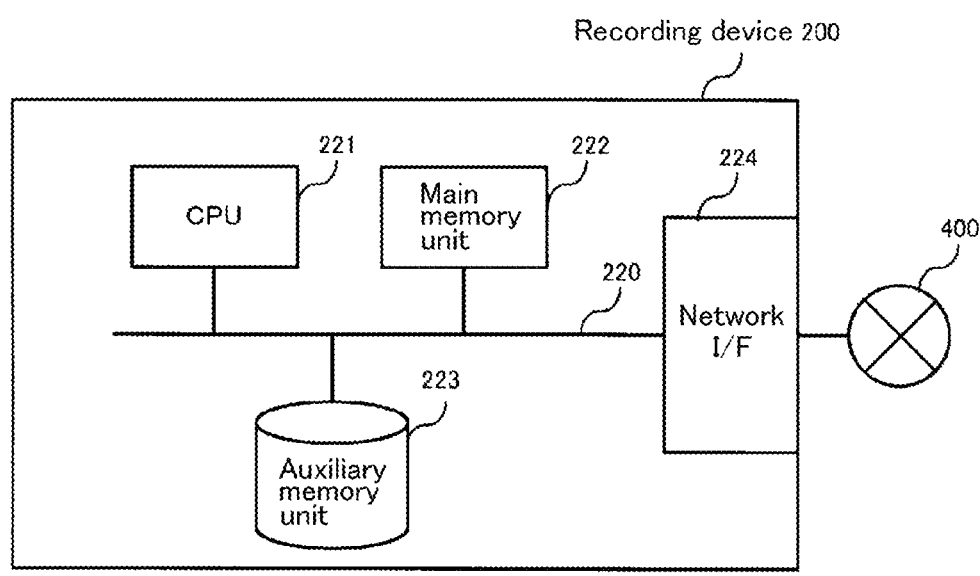
FIG. 3 is a diagram showing an example of the hardware configuration of the recording device.

FIG. 3 shows an example of the hardware configuration of the video recording device 200.

As shown in FIG. 3, the hardware configuration of the recording device 200 is a configuration where a CPU (central processing unit) 221, a main memory unit 222, an auxiliary memory unit 223 and a network I/F 224 are connected through a bus 220.

The CPU 221 controls the respective units in the recording device 200 and runs a program for implementing the functions. The main memory unit 222 is implemented with a semiconductor device such as a DRAM (Dynamic Random Access Memory), and is a memory in the middle for storing loaded image data for searching and a loaded program that is to be run in the CPU 221. The auxiliary memory unit 223 is implemented with an HDD or a flash memory, is a memory of which the capacity is larger than that of the main memory unit 222, and stores image data and programs. The network I/F 224 is an interface for receiving image data from the imaging device 100, for receiving a search keyword from the terminal device 300, and for transmitting image data to the terminal device 300 via the network 400.

Figure 4:
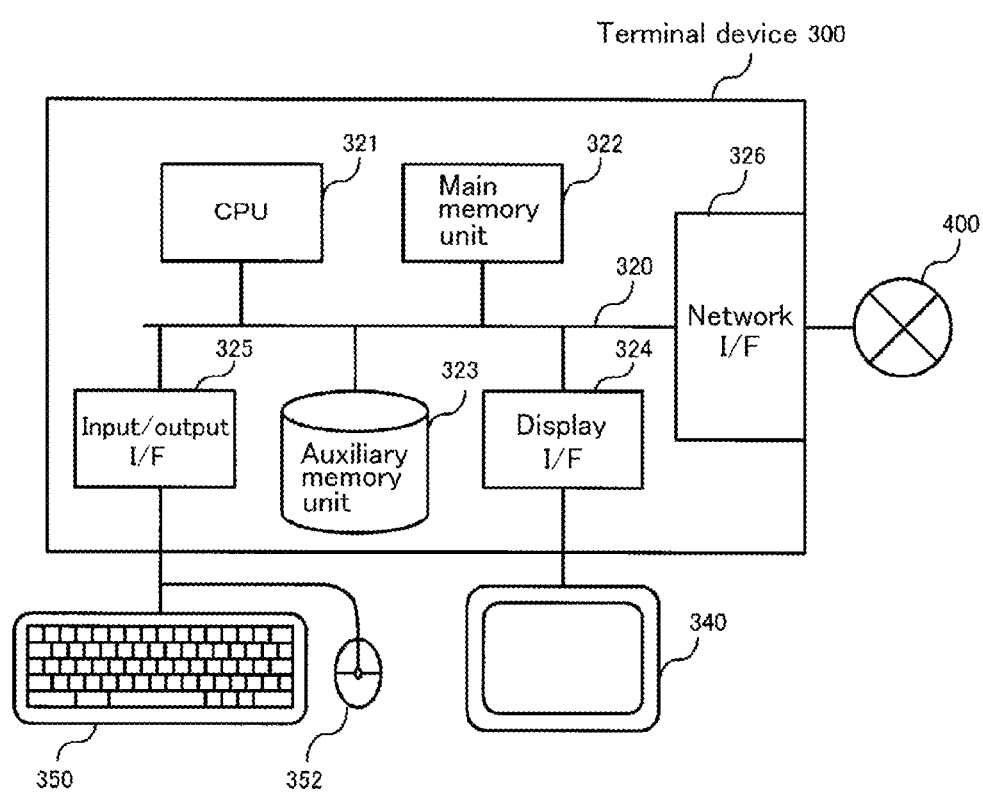
FIG. 4 is a diagram showing an example of the hardware configuration of the terminal device.

FIG. 4 shows an example of the hardware configuration of the terminal device 300.

As shown in FIG. 4, the hardware configuration of the terminal device 300 is a configuration where a CPU 321, a main memory unit 322, an auxiliary memory unit 323, a display I/F 324, an input/output I/F 325 and a network I/F 326 are connected through a bus 320.

The CPU 321 controls the respective units in the terminal device 300 and runs a program for implementing the functions. The main memory unit 322 is implemented with a semiconductor device such as a DRAM, and is a memory in the middle for storing loaded image data for display and a loaded program that is to be run by the CPU 321. The auxiliary memory unit 323 is implemented with an HDD or flash memory, is a memory of which the capacity is larger than that of the main memory unit 322, and stores search keywords, image data and programs. The display I/F 324 is an interface for the connection with the display device 340. The input/output I/F 325 is an interface for the connection with an input/output device such as a keyboard 350 or a mouse 352. The network I/F 326 is an interface for transmitting a search keyword to the recording device 200 or receiving image data from the recording device 200 via the network 400. The display device 340 is a device such as an LCD (Liquid Crystal Display), for example, and is a device for displaying an image or an animated image.

Figure 5:
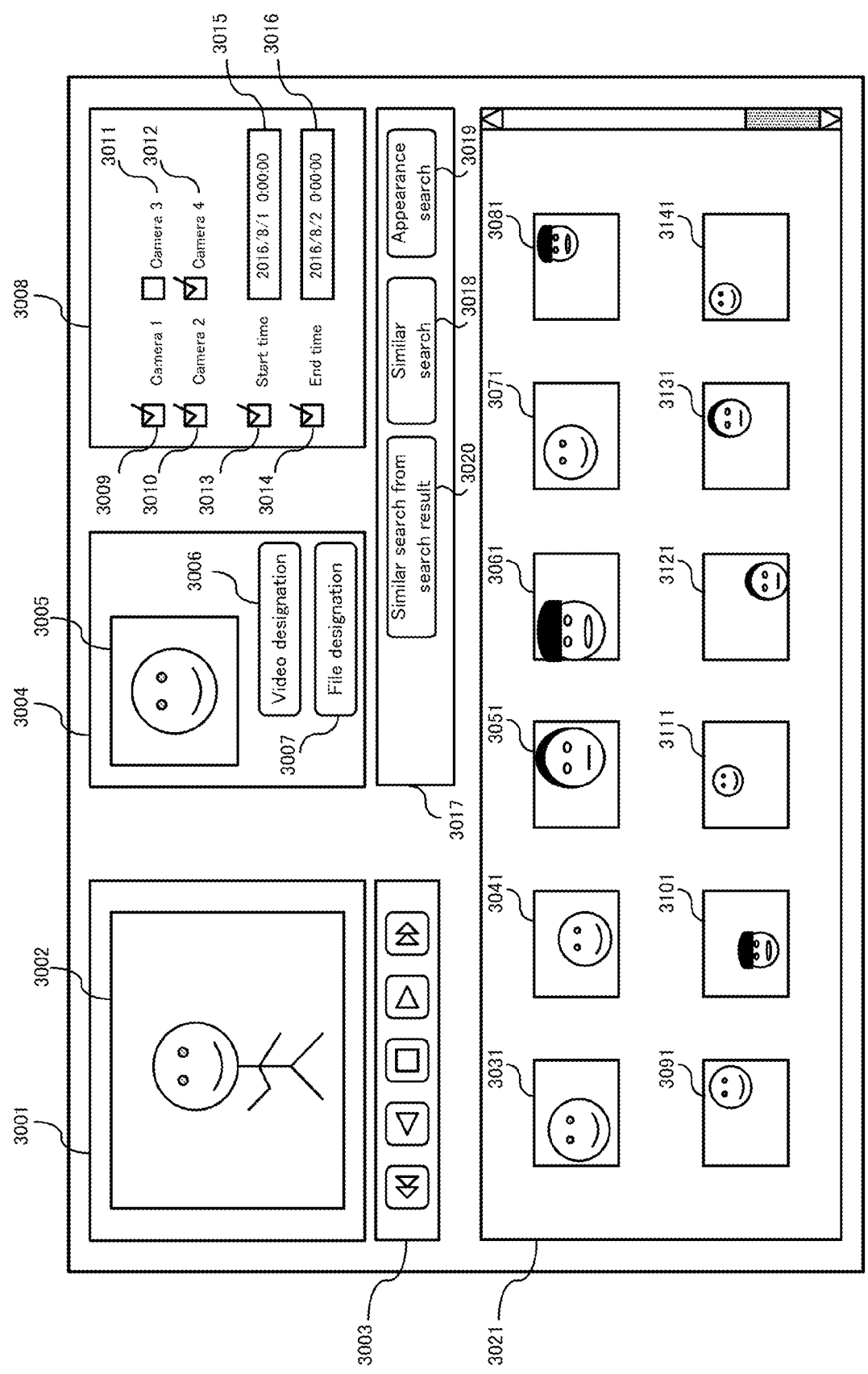
FIG. 5 is a diagram showing an example of the search screen in the conventional system.
Figure 6:
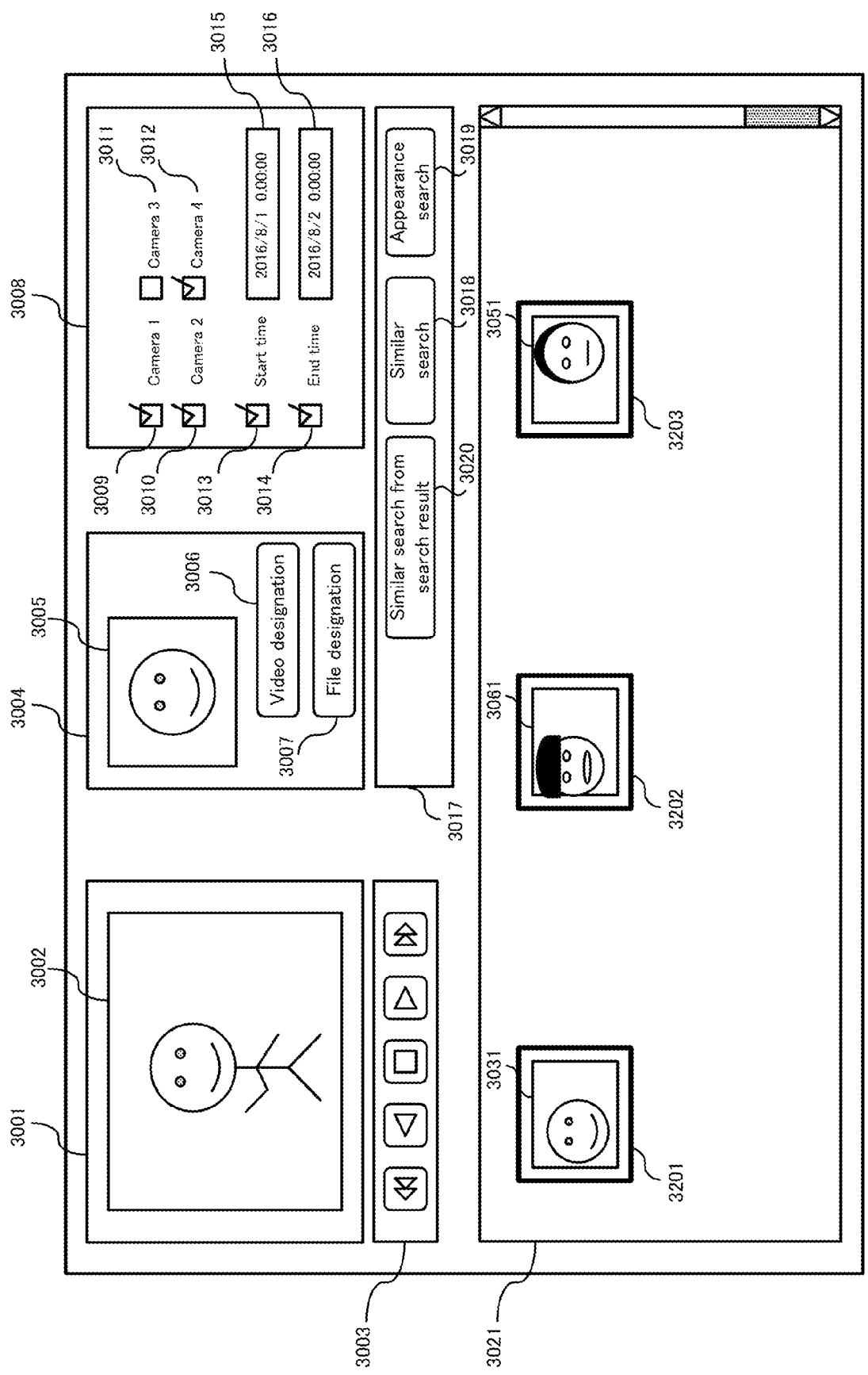
FIG. 6 is a diagram showing an example of the search screen in the system according to the present invention which shows how the search results are classified on the basis of the hairstyle.

Next, a method for appropriately collecting the search results is described in reference to FIGS. 5 through 8. FIGS. 5 through 8 show the contents of the display on the search screen in the terminal device 300. FIG. 5 shows an example of the search screen in the conventional system, and FIGS. 6 through 8 show an example of the search screen in the system according to the present invention. FIG. 6 shows how the search results are classified on the basis of the hairstyle. FIG. 7 shows how the search results are classified on the basis of the hairstyle and are developed for each person. FIG. 8 shows how further search results are acquired by again searching for one person who is included in the search results from among the search results.

First, the search screen in the conventional system shown in FIG. 5 is described.

The search screen has a reproduced image display region 3001, an image reproducing operation region 3003, a search key image designating region 3004, a search narrow parameters designating region 308, a search implementing region 3017 and a search result display region 3021.

The reproduced image display region 3001 is a region where images that are recorded in the recording device 200 are displayed as an animated image. An animated image 3002 displayed in the reproduced image display region 3001 is images recorded in the recording device 200 that are displayed as an animated image.

The image reproducing operation region 3003 is a region for a reproduce operation for the images recorded in the recording device 200. Inherent play types are allocated to the respective buttons that form this region. FIG. 5 shows an example where the play types of rewinding, reverse play, stopping play, forward play and cueing are allocated to the buttons starting from the front in this order. When each button is selected appropriately, the animated image 3002 is switched to the play type that is allocated to the selected button.

The search key image designating region 3004 is a region for designating and displaying a search key image. This region has a search key image 3005, a video designating button 3006 and a file designating button 3007.

The search key image 3005 is an image that is used as a key for similar searches. In the initial state, the search key image 3005 is not designated, and thus, no images are displayed in this state. Alternatively, an image that has been prepared separately to show a non-designated state may be displayed, or there may be a description to the effect that there is no designation.

The video designating button 3006 is a button for designating an image that is displayed in the reproduced image display region 3001 when selected as a search key image 3005.

The file designating button 3007 is a button for designating an image other than the images that have been recorded in the recording device 200, for example, an image taken by a digital still camera or an image that has been taken in through a scanner, as a search key image 3005. When this button is pushed, a dialogue box for designating the file for these images is displayed where the user designates a desired image.

The search narrow parameter designating region 3008 is a region for designating the type of narrow parameters at the time of searching and the value (range) thereof. This region has imaging device designating checkboxes 3009, 3010, 3011 and 3012, and time designating checkboxes 3013 and 3014 and time designating boxes 3015 and 3016.

The imaging device designating checkboxes 3009, 3010, 3011 and 3012 are checkboxes for designating the imaging device 100 which is the subject to be searched at the time of searching. These checkboxes respectively display a checkmark that indicates that the checkbox has been selected. This mark is not displayed when selected again, and display and non-display is repeated when respectively selected.

In the initial state, all the imaging devices 100 (cameras 1 through 4) are the subjects to be searched, and therefore, the imaging device designating checkboxes 3009, 3010, 3011 and 3012 are all in the selected state.

The time designating checkboxes 3013 and 3014 are checkboxes for designating the time range that becomes the subject to be searched at the time of searching. As for the display mode, these checkboxes are the same as other checkboxes. In the case where the time designating checkbox 3013 is in the selected state, the start time is given to the time range. In the case of a non-selected state, the start time is not given to the time range, which means that the range of the subjects to be searched covers the images that have been recorded in the recording device 200 up to the one at the oldest time. Likewise, in the case where the time designating checkbox 3014 is in the selected state, the end time is given to the time range. In the case of the non-selected state, the end time is not given to the time range, which means that the range of the subject to be searched covers the images that have been recorded in the recording device 200 up to the one at the most recent time.

The time designating boxes 3015 and 3016 are input boxes for designating the values of the above-described start time and end time.

In the initial state, the entire time band is the subject to be searched, and therefore, the time designating checkboxes 3013 and 3014 are both in the non-selected state, and the time designating boxes 3015 and 3016 are blank boxes.

The search implementing region 3017 is a region for instructing to implement a search. This region has a similar person search button 3018 and an appearance event search button 3019, and in addition, a similar person search button 3020 for the search from the search results.

The similar person search button 3018 is a button for instructing to implement a similar person search using the search key image 3005. In the case where a parameter is designated in the search narrow parameter designating region 3008, a similar person search is instructed to be implemented in accordance with the designated parameter.

The appearance event search button 3019 is a button for instructing to implement an appearance event search. In the case where a parameter is designated in the search narrow parameter designating region 3008, an appearance event search is instructed to be implemented in accordance with the designated parameter.

The search result display region 3021 is a region for displaying the search results. The display of the search results is carried out by displaying the search result images in a list. In the initial state, nothing is displayed in the search result display region 3021.

Here, it is assumed that the user pushed the video designating button 3006 and selected the imaging device designating checkboxes 3009, 3010 and 3012, and furthermore selected the time designating checkboxes 3013 and 3014 and inputted "2016/8/1 0:00:00" and "2016/8/2 0:00:00" respectively in the time designating boxes 3015 and 3016.

As a result, the search key image 3005 displays as a search key image the person "Mr. A" who has been displayed in the animated image 3002, three cameras "camera 1" "camera 2" and "camera 4" are designated as the imaging device 200 that is desired to be the subject to be searched, and "from 2016/8/1 0:00:00 to 2016/8/2 0:00:00" is designated as the time range that is desired to be the subject to be searched.

It is assumed that after that, the user pushed the similar person search button 3018. Thus, the search result display region 3021 displays the search results that have been acquired by implementing a similar person search by using the search key image 3005 as the key. The display of the search results is carried out by displaying search result images (in FIG. 5, search result images 3031 through 3141) in a list.

The search result images 3031 through 3141 are displayed in the order of the similarity to the search key image 3005 starting from the left to right at the uppermost row followed by the left to right in the second row, for example. In this display example, it is shown that the search result image 3031 has the highest similarity to the search key image 3005, and the search result image 3141 has the lowest similarity.

Concerning the description in the example shown in FIG. 5, icons illustrated as the search result images 3031 through 3141 display simplified human faces, and it is shown that "Mr. A" who is the same person as in the search key image 3005 appears in the search result image 3031, for example. In the similar face image search system, the same person as in the search key image is not necessarily searched for. For example, a different person ("Mr. B") is displayed in the search result image 3051, and another different person ("Mr. C") is displayed in the search result image 3061. Actual images are of course displayed in these parts where the simplified images are shown on the display in the actual system.

When any of the search result images 3031 through 3141 is clicked with the mouse so as to be selected, the selected search result image is displayed as the search key image 3005. As a result, a additional search can be carried out by using the search result image.

Here in FIG. 5, three people are irregularly displayed in the search result display region 3021. In this display on the screen in the conventional system, a number of people respectively appear in a number of images, and the user must determine the respective people by themselves, and thus, the system is inconvenient.

Therefore, in order to solve the above-described inconvenience, the present invention proposes screen displays as shown in FIGS. 6 through 8.

The screen display in the system according to the present invention has a region for displaying a number of search results that have been collected for each person. In the examples shown in FIGS. 6 through 8, three organized search result regions 3201, 3202 and 3203 are provided in response to the three searched people respectively.

The organized search result regions 3201, 3202 and 3203 are display regions showing that a number of search results are collected in each group. FIG. 6 shows only one image that represents the search results that have been collected as one group within the organized search result regions 3201, 3202 and 3203 respectively.

In FIG. 6, the 12 search result images 3031 through 3141 that have been acquired as the search results are divided into groups by using the feature value of the hairstyle that are respectively attached thereto. That is to say, the search result images 3031 through 3141 are classified in such a manner that the images of which the hairstyles are similar belong to the same groups. In the case where the search result images 3041, 3071, 3091, 3111 and 3141 have a close feature value of the hairstyle (high similarity) to that of the search result image 3031 in FIG. 5, for example, these images are grouped within the organized search result region 3201 in FIG. 6. In addition, only one image, the search result image 3031, is displayed in the form that represents the search results including the other images. Next, the images of which the feature value of the hairstyles are close (high similarity) to that of the search result image 3061 from among the remaining search result images are grouped within the organized search result region 3202. Furthermore, the images of which the feature value of the hairstyles are close (high similarity) to that of the search result image 3051 are grouped within the organized search result region 3203. The requirement that the similarity of the feature value of the hairstyle is 90% or higher, for example, can be used as the standard for grouping. Here, the grouping may depend on the feature value other than the hairstyle. For example, grouping may be based on the feature value of clothes worn. Usually, the hairstyle, the clothes worn and the accessories worn do not change during the day (keep wearing the same things), and therefore, it is appropriate to use these items as the feature value when carrying out the similar search within the range of 24 hours or less.

In this manner, the user need confirm only three images when performing a grouping display in which the search result images are classified into groups and displayed.

Here, in the case where the similar image search system has a number of imaging devices, the similarity between the search result images may be modified on the basis of the locations in which the search result images have been taken and the times at which the search results images have been taken. That is to say, the possibility of the image of the same person being taken is high for the search result images that have been taken within a predetermined period of time by the different imaging devices that are proximity to each other, and therefore, a modification is carried out where the similarity between these search result images is increased. In addition, the possibility of the images of different people being taken is high for the search result images that have been taken within a predetermined period of time by different imaging devices that are not in close proximity to each other, and therefore, a modification is carried out where the similarity between these search result images is lowered. In one example, the combinations of imaging devices that are in close proximity are stored in advance, it can be determined whether the images have been taken by the imaging devices that are in proximity to each other. In another example, the data on the locations at which the images are taken (data on the locations of the imaging devices) is added to the images when stored and the distance between the locations at which the images are taken that is found from the data on the locations in which the respective search result images have been taken is compared to a predetermined value, it can be determined whether the images have been taken by imaging devices that are in proximity to each other.

As a result of these modifications, an increase in the precision of the grouping can be achieved. Here, only the modification of increasing the similarity may be carried out, only the modification of lowering the similarity may be carried out, or both modifications may be carried out.

In addition, the organized search result regions 3201, 3202 and 3203 are displayed in the order of the similarity starting from the left to right (furthermore, from the top to the bottom), for example. This display example shows that the organized search result region 3201 has the highest similarity to the search key image 3005, and the organized search result region 3203 has the lowest similarity.

As described above, the groups in the grouping display (organized search result regions) can be displayed in the order of the similarity so that it can be easier for the user to find an image of the targeted person.

As for the similarity between each group and a search key image, the maximum value of the similarity to the search key image that has been calculated for each search result image that belongs to the group may be used, the average value of these similarity may be used, or the value that has been calculated in accordance with another technique may be used.

In addition, though the groups are aligned in the order of the similarity to the search key image in the display in this example, another mode where the order in the similarity between each group and the search key image can be visually recognized may be used for the display. For example, numeric values that represent the similarity may be additionally displayed, a display where the colors or gradations of the frames or the background of the organized search result region are changed in accordance with the similarity may be used, or icons that visually express the similarity may be added to the display.

Here, the grouping display of the search result images may be performed at all times or may be performed only in the case where the number of search result images becomes equal to or greater than a predetermined threshold value. As for the threshold value in this case, a fixed value may be used, the user may arbitrarily set a value, or the system may automatically set a value (for example, the upper limit number of images that can be contained within the search result display region without scrolling may be set to the threshold value). As a result, it is possible to avoid an inconvenient situation such as the search result display region not being able to be contained within the screen or not being visually recognized when the number of images in the search result display region 3021 increases.

Next, in FIG. 7, the organized search result regions 3201, 3202 and 3203 are developed. When an organized search result region that has attracted attention is clicked with the mouse, a number of search results are developed within the organized search result region as shown in FIG. 7. Though FIG. 7, display 12 search results of which the number is the same as in FIG. 5, they are not displayed at random, unlike in FIG. 5, but are grouped for each hairstyle, which makes it easy for the user to recognize.

Furthermore, in FIG. 8, the organized search result region 3201 is selected, and the state where the similar search box button has been clicked from the search results is displayed. The additional search result display region 3301 is a region for displaying the search results that have been newly found through the search by using the search result image 3031, 3041, 3071, 3091, 3111 or 3141 as the search key image. In FIG. 8, newly found additional search result images 3311, 3321, 3331, 3341, 3351 and 3361 are displayed within the additional search result display region 3301. Here, examples of a method for searching for an appropriate image from a number of search key images include the method that is disclosed in Japanese Unexamined Patent Publication 2013-101431.

Though the configuration according to the present embodiment is described as a configuration where a person detecting process concerning the search for a person and the personal feature value sampling process are carried out in the recording device, these processes may be carried out in a device separate from and connected via a network to the recording device.

Furthermore, though the search results are organized depending on the similarity of the feature value of the hairstyle according to the method in the present embodiment, the feature value of the clothes or accessories worn or the items being carried by the person may be used.

As described above, the present embodiment provides a configuration where, in a similar image search system which searches for person images similar to the search key image (3005) that is the person image of the search key, a number of searched person images (3031 through 3141) are classified into a number of groups on the basis of the similarity between the respective person images, the grouping display is performed in which at least one of the person images that belong to each group is displayed in the display region (3201, 3202 or 3203) that is provided for each group, and the grouping display is performed in such a manner that the order of the similarity between each group and the search key image can be visually recognized.

As a result, a number of person images similar to the search key image are displayed in each of the different groups, and therefore, it can be prevented for the display from becoming hard to recognize in the case where a large number of images of the same person are searched for. In addition, the order of the similarity between each group and the search key image can be easily grasped.

Here, the similar person search (search for person images similar to the search key image) and the grouping of the search results (classification of the searched person images) are both carried out on the basis of the feature value that has been detected from the person images, and the feature value of the different types is used for each case. For example, the feature value of the face can be used for the similar person search, and the feature value of the hairstyle, the clothes worn or the like excluding the face can be used for the grouping of the search results. Alternatively, the feature value of the face and the hairstyle may be used for the similar person search, and the feature value of the clothes worn or the like excluding the face and the hairstyle may be used for the grouping of the search results. In addition, it is possible to use the feature value that has been detected in a system (for example, a facial recognition system) that is different from the similar image search system for the grouping of the search results.

In addition, various modes can be used as the mode that allows the order of the similarity between each group and the search key image to be visually recognized. A mode for displaying each group in the order of the similarity, a mode for additionally displaying the numeric values that represent the similarity, a mode for displaying the frame or the background of the organized search result region by changing colors or gradations in accordance with the similarity, a mode for additionally displaying icons that visually express the similarity and the like can be cited as examples.

In order for the grouping display, it is preferable to prepare a first mode where only person image(s) represents each group is displayed and a second mode where all person images within each group are displayed in such a manner that these modes can be switched through the operation by the user. Here in the first mode, one person image that is most similar to the search key image may be used as the representative image or a predetermined number of images of a person selected in accordance with the order of the higher similarity may be used as the representative images.

It is also preferable for the grouping display to be performed in the case where the number of search result images becomes equal to or greater than a predetermined threshold value. As a result, the grouping display can be performed only in the case where the grouping display is more desirable than the normal display, that is to say, only in the case where the number of the search result images is so great as to make it hard to recognize the images. Conversely, in the case where the normal display is more desirable than the grouping display, that is to say, in the case where the number of search result images is so small as to make it possible to grasp all the search result images at a glance, the grouping display can be prevented.

Furthermore, it is preferable for the search results to be grouped on the basis of the results of at least either the modification where the similarity between the person images that have been taken within a predetermined period of time by different imaging devices that are in close proximity to each other is increased, or the modification where the similarity between the person images that have been taken within a predetermined period of time by different imaging devices that are not in close proximity to each other is lowered. As a result, the person images of which the possibility of the person being the same person is high when taking into consideration the locations in which the images have been taken and the times at which the images have been taken can be classified in the same group, whereas the person images of which the possibility of the person being a different person is high when taking into consideration the locations in which the images have been taken and the times at which the images have been taken can be classified into a different group, and thus, the precision of grouping can be increased.

In a more extended example, data that indicates a behavior pattern whether a person is by themselves or in a group is made to correspond to each of the person images, and the search results may be grouped on the basis of the results of a modification where the similarity between the person images having a same behavior pattern is increased, or a modification where the similarity between the person images having a different behavior pattern is lowered. As a result, grouping is possible taking into consideration whether the person prefers to be by themselves or in a group. Here, the number of people who are together with the person may be made to correspond to the information indicating the behavior pattern so that the similarity can be modified taking the number of people who are together with the person into consideration.

Here, the configuration including the system and the devices according to the present invention is not necessarily limited to the one shown in the above, but various configurations may be used.

It is also possible to provide the present invention with a method or a system for implementing the process according to the present invention, a program for implementing such a method or system, a recording medium for storing such a program or the like.

INDUSTRIAL APPLICABILITY

The present invention can be used for a similar image search system which searches for person images similar to the search key image, which is a person image of a search key.

REFERENCE SIGNS LIST

100 imaging device
120 bus 121 imaging unit
122 main memory unit
123 encoding unit
124 network I/F
200 recording device
201 image transmission/reception unit
202 image recording unit
203 reproduction control unit
204 person region detection unit
205 personal feature value sampling unit
206 personal feature value recording unit
207 attribute data recording unit
208 request receiving unit
209 similar person search unit
210 appearance event search unit
211 search result transmitting unit
212 keyword recording unit
213 keyword search unit
220 bus
221 CPU
222 main memory unit
223 auxiliary memory unit
224 network I/F
300 terminal device
301 search request transmitting unit
302 search result receiving unit
303 search result display unit
304 reproduced image display unit
305 screen operation detecting unit
306 keyword adding request transmitting unit
307 multiple search key selecting unit
320 bus
321 CPU
322 main memory unit
323 auxiliary memory unit
324 display I/F
326 network I/F
340 display device
350 keyboard
352 mouse
400 network
3001 reproduced image display region
3002 animated image
3003 image reproducing operation region
3004 search key image designating region
3005 search key image
3006 video designating button
3007 file designating button
3008 search narrow parameters designating region
3009, 3010, 3011, 3012 imaging device designating checkbox
3013, 3014 time designating checkbox
3015, 3016 time designating box
3017 search implementing region
3018 similar person search button
3019 appearance event search button
3020 similar person search button from search result
3021 search result display region
3031, 3041, 3051, 3061, 3071, 3081, 3091, 3101, 3111, 3121,
3131, 3141 search result image
3201, 3202, 3203 organized search result region
3301 additional search result display region
3311, 3321, 3331, 3341, 3351, 3361 additional search result image

The invention claimed is:

1. A similar image search system which searches for person images similar to a search key image, which is a person image of a search key, from a recording device and displays the searched person images on a terminal device, by a processor, characterized in that a number of searched person images are classified, by the processor, into a number of groups on the basis of a similarity between the respective person images, and a grouping display is performed in which at least one of the person images that belong to each group is displayed in a display region that is provided for each group; the grouping display is performed in such a mode where the order of the similarity between each group and the search key image can be visually recognized; and the searched person images are classified, by the processor, into each group on the basis of the results of at least either modification (a) where the similarity between person images, the person images having been taken within a predetermined period of time by different imaging devices that are in proximity to each other is increased, or modification (b) where the similarity between person images, the person images having been taken within a predetermined period of time by different imaging devices that are not in proximity to each other, is lowered.

2. The similar image search system according to claim 1, wherein the grouping display is performed when the number of the searched person images is equal to or greater than a predetermined threshold value.

3. The similar image search system according to claim 1, wherein the mode that allows the order of the similarity between each group and the search key image to be visually recognized includes any of a mode for displaying each group in the order of the similarity, a mode for additionally displaying the numeric values that represent the similarity, a mode for displaying the frame or the background of the display region by changing colors or gradations in accordance with the similarity, or a mode for additionally displaying icons that visually express the similarity.

4. The similar image search system according to claim 1, wherein:
the search for the person images similar to the search key image is carried out by using the feature value of the face in the person image, and
the classification of the searched person images to each group is carried out by using the feature value of the person excluding those of the face.

5. The similar image search system according to claim 1, wherein:
the search for the person images similar to the search key image is carried out by using the feature value of the face and the hairstyle in the person image, and
the classification of the searched person images to each group is carried out by using the feature value of the person excluding those of the face and the hairstyle.

6. The similar image search system according to claim 1, wherein the grouping display includes a first mode where only a person image who represents each group is displayed and a second mode where all person images within each group are displayed, and these modes are configured to be switched through an operation by a user.

7. The similar image search system according to claim 1, wherein:
data that indicates a behavior pattern whether the person is by themselves or in a group is made to correspond to each of the person images, and
the searched person images may be grouped on the basis of the results of modification (c) where the similarity between the person images having the same behavior pattern is increased, or modification (d) where the similarity between the person images having a different behavior pattern is lowered.

\* \* \* \* \*